350-357
4/17/79 XR 4,150,365
SR

United States Patent [19]
Natori et al.
[11] 4,150,365
[45] Apr. 17, 1979

[54] DRIVER CIRCUIT FOR ELECTROCHROMIC DISPLAY DEVICE

[75] Inventors: Minoru Natori, Tokyo; Toshikazu Hatuse, Tanashi; Kouhei Kawanobe, Kawagoe; Hiroshi Ogawa, Tokorozawa; Fukuo Sekiya, Tokorozawa; Katsuo Nishimura, Tokorozawa, all of Japan

[73] Assignee: Citizen Watch Co., Ltd., Tokyo, Japan

[21] Appl. No.: 702,000

[22] Filed: Jul. 1, 1976

[30] Foreign Application Priority Data

| | | | |
|---|---|---|---|
| Jul. 2, 1975 | [JP] | Japan | 50/81576 |
| Aug. 1, 1975 | [JP] | Japan | 50/94003 |
| Aug. 14, 1975 | [JP] | Japan | 50/98813 |

[51] Int. Cl.[2] .......... G06K 15/18
[52] U.S. Cl. .......... 340/763; 58/50 R; 350/357; 340/785; 340/798; 340/804
[58] Field of Search .......... 340/324 EC, 336, 324 M; 58/50 R; 350/160 R, 333, 357

[56] References Cited

U.S. PATENT DOCUMENTS

| | | | |
|---|---|---|---|
| 3,807,832 | 4/1974 | Castellion | 340/324 EC |
| 3,839,857 | 10/1974 | Berets et al. | 340/336 X |
| 3,896,430 | 7/1975 | Hatsukano | 340/336 |
| 3,938,131 | 2/1976 | Van Doorn et al. | 350/160 R |

*Primary Examiner*—David L. Trafton
*Attorney, Agent, or Firm*—Holman & Stern

[57] ABSTRACT

A driver circuit for an electrochromic display device which includes segment electrodes and a common electrode. The driver circuit has a power source, switching means connected between the power source and the segment electrodes, and circuit means disposed between the common electrode and the power source. The circuit means is operative to couple the common electrode to either a positive terminal or a negative terminal of the power source, whereby an electric current will flow through the segment electrodes in bleaching and coloring directions with the use of a single power source.

11 Claims, 23 Drawing Figures

DRIVER CIRCUIT FOR ELECTROCHROMIC DISPLAY DEVICE

This invention relates to a driver circuit for an electrochromic display device and, more particularly, to a driver circuit for an electronic timepiece of the type using an electrochromic display device.

Although liquid crystal display devices have been widely exploited as electro-optical display means, electrochromic display devices have been recently used in various applications such as electronic timepieces and calculators, etc. In general, liquid crystal display devices employ the application of electric potentials to alter the orientation of liquid crystals, with information being displayed by changing such electro-optical characteristics as the dispersion of light or by the effect of rotating the polarization plane. Electrochromic display devices, on the other hand (hereinafter referred to as EC display devices), use electric potentials to bring about a current flow through an electrochromic substance such as $WO_3$ or $MoO_3$, whereby reduction and coloration of the electrochromic substance is achieved. This state of coloration has a persistence which lasts for periods of from one minute to one week in length, while the application of an opposite voltage or heat oxidizes the material and erases its color.

In structure, an EC display device may be of solid state type in which a transparent electrode, an EC layer, an insulating layer and a thin counter electrode film are disposed on a single transparent glass substrate; a liquid type in which a transparent electrode, an EC layer or an insulating layer on a lead wire are disposed on an upper single transparent glass substrate and a counter electrode of carbon or the like is disposed on a lower substrate, with an electrolyte such as $H_2SO_4$ sealed between both substrates; or an organic liquid type in which an organic substance is colored or bleached by suitably reversing an electric potential.

To drive such an EC display device, a common electrode of the EC display device is connected to ground. For coloration, a segment electrode is opened after having been connected to a negative power source (−V) for a required period of time. For bleaching, the segment electrode is opened after having been connected to a positive power source (+V) for a required period. Two power sources for +V and −V are thus required. To equip an electronic timepiece with two power sources entails either installing two individual batteries or providing a booster to raise the voltage on one side; both of these alternatives, however, offer major limitations and are disadvantages when applied to electronic timepieces.

Liquid crystals employed in conventional timepieces do not exhibit persistence and their response speed is high; as a result, a display drive method merely entailed operating driver circuits through counters and decoders and driving the crystals alternately. However, display elements which exploit electrochromic materials exhibit a color persistence requiring that a voltage of a polarity opposite to that which produced the colored state be applied in order to restore the bleached state.

It is, therefore, an object of the present invention to provide an improved driver circuit for an electrochromic display device.

It is another object of the present invention to provide a driver circuit arranged to drive an electrochromic display device with the use of a single power source.

It is another object of the present invention to provide a driver circuit for an electrochromic display device, which driver circuit is arranged to minimize power consumption.

It is another object of the present invention to provide a driver circuit which is simple in construction and highly reliable in operation and which is suited for use in an electronic timepiece of the electrochromic display type.

It is still another object of the present invention to provide an improved method of driving an electrochromic display device by which a desired display is highly reliably performed and power consumption is remarkably reduced.

It is a further object of the present invention to provide a method of alternately driving display elements of an electrochromic display device in a repetitive manner.

It is a still further object of the present invention to provide a method of driving display elements of an electrochromic display device during time intervals delayed in phase depending upon the coloration and bleaching speed of the electrochromic material used for the display device.

It is a still further object of the present invention to provide an electronic timepiece of the type having an electrochromic display device adapted to be controlled by a driver circuit which is arranged to drive display elements in a highly reliable manner with a minimum power consumption.

It is a still further object of the present invention to provide an electronic timepiece of the type including an electrochromic display device having display elements which are driven at differing timings to prevent erroneous display.

These and other objects, features and advantages of the present invention will become more apparent from the following description when taken in conjunction with the accompanying drawings, in which.

Figure 1:
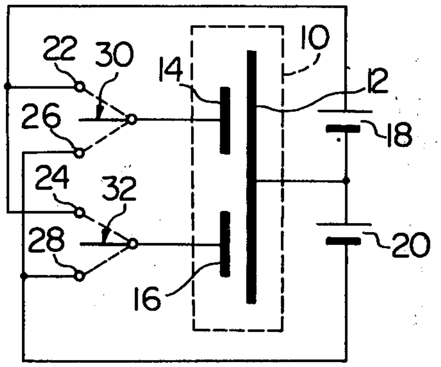
Fig. 1 PRIOR ART
FIG. 1 is an circuit diagram showing a conventional method of driving an electrochromic display device.

Referring now to FIG. 1, there is shown an example of electric circuitry adapted to drive an electrochromic display device 10. The electrochromic display device 10 comprises a common electrode 12, and segment electrodes 14 and 16. The common electrode 12 is coupled between two batteries 18 and 20 connected in series. Battery 18 has its positive terminal coupled to "bleach" contacts 22 and 24, and battery 20 has its negative terminal coupled to "color" contacts 26 and 28. The segment electrodes 14 and 16 are coupled to switching means such as movable switch arms 30 and 32, which are normally open as shown in FIG. 1. In order to produce coloration in the display device 10, the switch arms 30 and 32 are thrown to the "color" contacts 26 and 28 to permit the flow of electric current from the common electrode 12 toward the segment electrodes 14 and 16. Once complete coloration is induced, the switch arms 30 and 32 may be opened, disconnecting the batteries 18 and 20 from the segment electrodes 14 and 16. To bleach or erase a previously colored surface, the switch arms 30 and 32 are thrown to the "bleach" contacts 22 and 24, permitting the flow of electric current from the segment electrodes 14 and 16 toward the common electrode 12. After the switch arms 30 and 32 are held in these positions for a certain time interval, the switch arms 30 and 32 are open. It will thus be seen that two batteries are required in the above circuit arrangement in order to selectively produce or remove coloration in the device 10. This is disadvantageous in that an electronic timepiece employing an electrochromic display device should be provided with two batteries, causing serious space requirement problems in the timepiece.

The present invention contemplates the provision of a driver circuit utilizing a single power source by which an electrochromic display device is selectively controlled. An illustrative example of the driver circuit according to the present invention is shown in FIGS. 2A, 2B, 2C and 2D, in which like or corresponding component parts are designated by the same reference numerals as those used in FIG. 1.

Figure 2A:
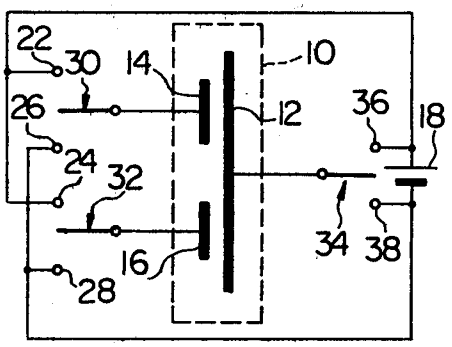
FIGS. 2A to 2D show a preferred embodiment of a driver circuit according to the present invention.
Figure 2B:
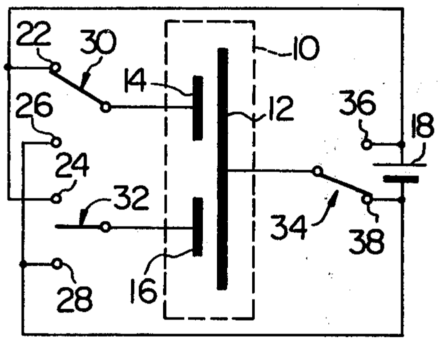
Figure 2C:
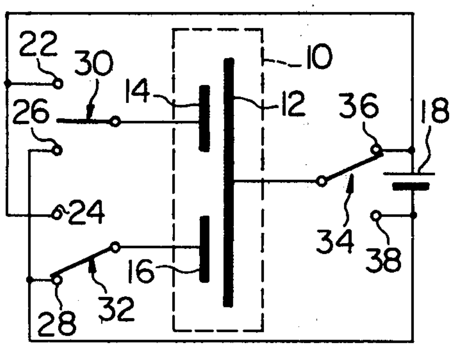
Figure 2D:
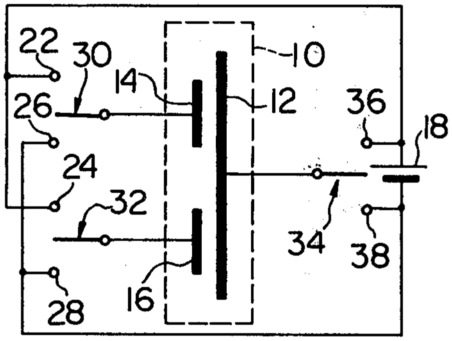

In the illustrated embodiment of FIGS. 2A to 2D, the driver circuit includes a third switching means such as a movable switch arm 34 coupled to the common electrode 12 of the electrochromic display device 10. The switching means 34 is normally opened, and connectable to either the positive or the negative terminal 36 or 38 of a single power source 18. While, in actual practice, the display device 10 has a number of segment electrodes, it is to be noted that only two segment electrodes are shown for the sake of simplicity of illustration. It is herein assumed that FIG. 2A shows that a display element (hereinafter referred to as segment 14) corresponding to the segment electrode 14 is in the colored state and a display element (hereinafter referred to as a segment 16) corresponding to the segment electrode 16 is in the bleached state. FIGS. 2B, 2C and 2D illustrate how the segment 14 is bleached and how the segment 16 is colored.

In FIG. 2A, the segments 14 and 16 are maintained in the colored and bleached states, respectively, by the persistent characteristic of the electrochromic material while the segment electrodes and the common electrode are open circuit. FIG. 2B shows a case in which the segment 14 is bleached. In this instance, the switching means 30 is coupled to the positive side of the battery 18 through the contact 22, and the switching means 34 is coupled to the negative side of the battery 18 through the contact 38. Thus, the segment electrode 14 has an applied voltage opposite that of the voltage which produces coloration, so that the coloration is removed. In this situation, the switching means 32 remains in its open state. FIG. 2C shows a case in which the segment 16 is colored. In this case, the switching means 32 is coupled to the negative terminal of the battery 18 through the contact 28, and the switching means 34 is coupled to the positive terminal of the battery 18 through the contact 36. Thus, a voltage is applied across the segment electrode 16 and the common electrode 12 in a direction to produce coloration. In this instance, the switching means 30 is maintained in its open state. FIG. 2D shows that the writing in of the display information has been completed. In this condition, while the segment electrodes 14 and 16 and the common electrode 12 are maintained in their open state, the segments remain in the colored and bleached states, respectively, by the persistence effect of the electrochromic material.

It will now be understood that in accordance with the present invention the common electrode 12 is not fixed to a given potential and instead thereof it can be selectively coupled to either the positive or the negative potential side of a single battery. As seen from FIGS. 2B and 2C, voltages of opposing polarity may be applied to a display segment to be colored and a display segment to be bleached, respectively, at different time. It should be noted that the writing in of the display information may be achieved in the order of FIGS. 2A, 2B, 2C and 2D or in the order of FIGS. 2A, 2C, 2B and 2D. It should also be born in mind that if the segment electrodes or the common elecrode remain in the open state when a display condition is maintained by the persistence effect of the electrochromic material, viz., in a state shown in FIGS. 2A and 2D, no change will be effected even when the other electrode side is coupled to the battery. In FIGS. 2A and 2D, for example, the memory function of the electrochromic (EC) display device 10 is not adversely affected even when the common electrode 12 is coupled to the battery 18. Also, if the display element has been bleached, the corresponding segment electrode may be short-circuited with the common electrode. For example, the segment electrode 16 shown in FIG. 2B may be coupled through the switching means 32 to the negative terminal of the battery 18, and the segment electrode 14 of FIG. 2C may be coupled to the positive terminal of the battery 18.

Figure 3:
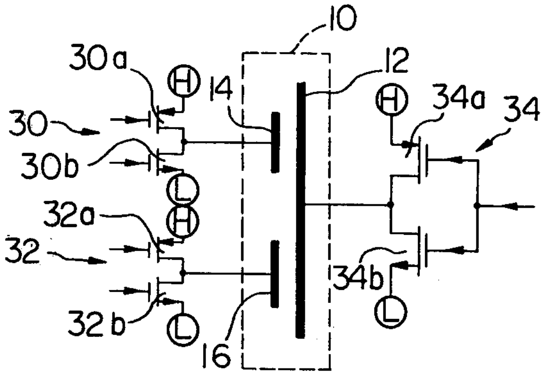
FIG. 3 is a modified form of the driver circuit shown in FIGS. 2A to 2D.

FIG. 3 shows a modified form of the driver circuit shown in FIGS. 2A to 2D, and like or corresponding component parts are designated by the same reference numerals as those used in FIGS. 2A to 2D. In FIG. 3, the switching means 30 comprises a P-channel metal oxide semiconductor field-effect transistor (P-channel MOS FET) 30*a* and an N-channel metal oxide semiconductor field-effect transistor (N-channel MOS FET) 30*b*. The source terminal of the P-channel MOS FET 30*a* is coupled to a positive terminal denoted H of a single power source, while the source terminal of the N-channel MOS FET 30*b* is coupled to a negative terminal denoted L of the single power source. The drain terminals of the P-channel MOS FET 30*a* and the N-channel MOS FET 30*b* are coupled together and connected to the segment electrode 14. Similarly, the switching means 32 comprises a P-channel MOS FET 32*a* and an N-channel MOS FET 32*b*. The source terminal of the P-channel MOS FET 32*a* is coupled to the positive terminal denoted H of the single power source, while the source terminal of the N-channel MOS FET 32*b* is coupled to the negative terminal denoted L of the single power source. The drain terminals of the P-channel MOS FET 32*a* and the N-channel MOS FET 32*b* are coupled together and connected to the segment electrode 16. Likewise, the switching means 34 comprises a P-channel MOS FET 34*a* and an N-channel MOS FET 34*b*, serving as a circuit means for coupling the common electrode 12 to either the positive or the negative terminal of the single power source. The source terminal of the P-channel MOS FET 34*a* is coupled to the positive terminal of the single power source while a source terminal of the N-channel MOS FET 34*b* is coupled to the negative terminal of the single power source. The drain terminals of the P-channel MOS FET 34*a* and the N-channel MOS FET 34*b* are coupled together and connected to the common electrode 12 of the display device 10. In a modification shown in FIG. 3, gate terminals of the P-channel MOS FET 34*a* and the N-channel MOS FET 34*b* are shown as connected to each other to provide an inverter, whereby when an alternating signal is applied to them the common electrode 12 may be alternately coupled to either the positive or the negative side of the power supply. However, it should be noted that the gate terminals may be disconnected from each other if desired.

With the arrangement mentioned above, the segment electrodes 14 and 16 are coupled to the positive side of the power supply when the voltage applied to the gate terminals of the P-channel MOS FET 30*a* and 32*a* becomes low level. When, in contrast, the voltage applied to the N-channel MOS FET 30*b* and 32*b* becomes high level, the segment electrodes 14 and 16 are coupled to the negative side of the power supply.

Figure 4:
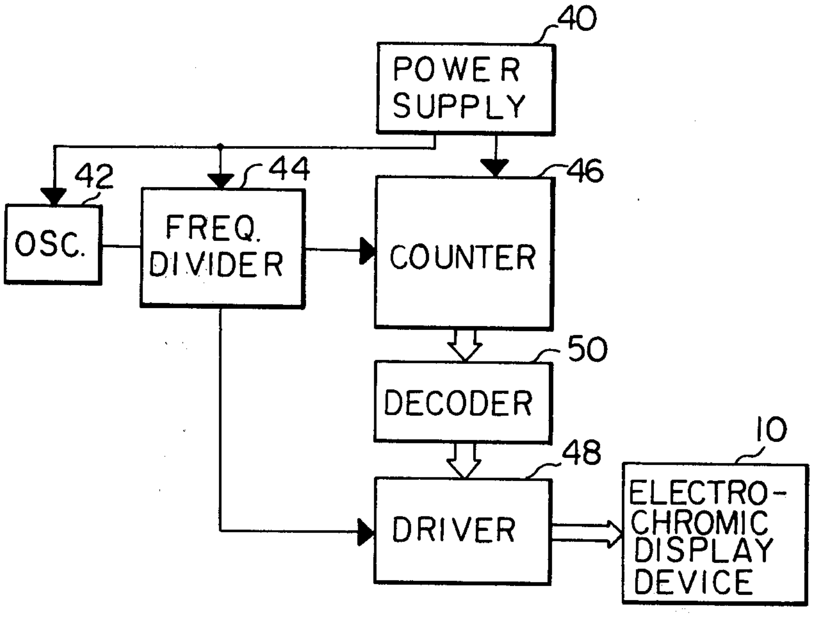
FIG. 4 is a block diagram of an example of an electronic timepiece incorporating a driver circuit according to the present invention.

FIG. 4 shows a block diagram of an example of an electronic timepiece incorporating a driver circuit according to the present invention. As shown, the electronic timepiece comprises a power supply 40 such as a commercially available d.c. battery, to which a crystal controlled oscillator 42 is coupled to receive power. The oscillator 42, which provides a 32,768 Hz signal, is well known and a detailed description of the same is herein omitted. This signal is applied to a frequency divider 44, which divides it down to produce a 1 Hz signal which is applied to a counter circuit 46. The frequency divider 44 also produces a clock pulse of a relatively higher frequency, which is applied to a driver circuit 48 to control the display device 10 in a manner as will be described in detail later. The counter circuit 46 is responsive to the 1 Hz signal and generates output signals for the seconds, minutes, hours and calendar date. Logic means, though not shown, are coupled to the counter circuit to reset the seconds, minutes, hours and date. The output of the counter circuit 46 is applied to a decoder 50, which in turn generates decoded signals, namely, display information signals. The decoded signals are applied to the driver circuit 48, which generates drive signals related to the decoded signals. The drive signals are applied to the electrochromic display device 10 to display time information.

Figure 5:
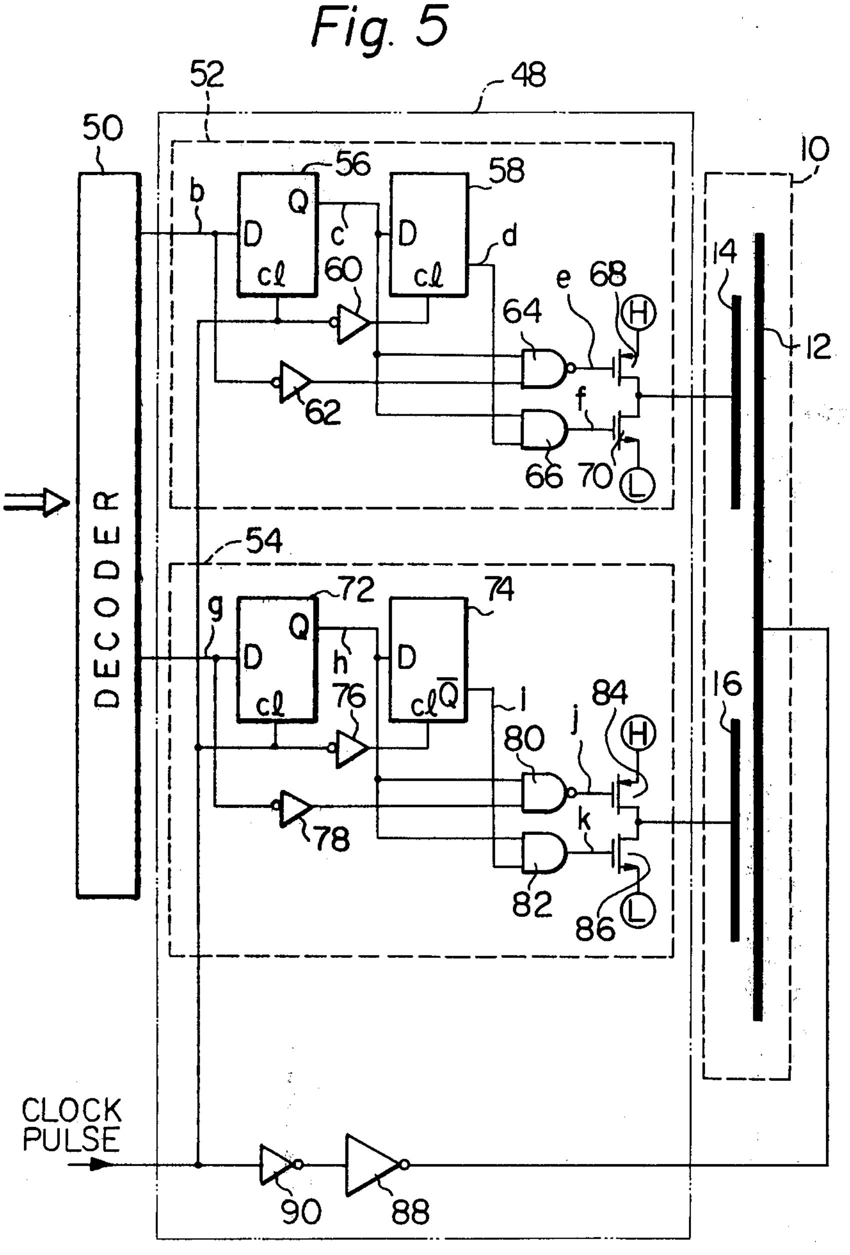
FIG. 5 is a detail circuitry for the driver circuit shown in FIG. 4.

FIG. 5 illustrates an example of a driver circuit shown in FIG. 4.

The driver circuit 48 comprises drive signal generating circuits 52 and 54 coupled to receive display information signals from the the decoder 50. The drive signal generating circuit 52 includes latch circuits 56 and 58, inverters 60 and 62, a NAND gate 64 and an AND gate 66. The latch circuit 56 has its data input terminal coupled to the decoder 50 to which one input of the NAND gate 64 is coupled via the inverter 62 to receive the display information signal. The Q output of the latch circuit 56 is coupled to the data terminal of the latch circuit 58 and inputs of the NAND gate 64 and the AND gate 66. The clock terminal of the latch circuit 56 is coupled to the frequency divider 44 (see FIG. 4) to receive a clock pulse therefrom. This clock pulse is inverted by the inverter 60 and applied to the clock terminal of the latch circuit 58, whose $\overline{Q}$ output is coupled to another input of the AND gate 66. The output of the NAND gate 64 is coupled to the gate terminal of a P-channel MOS FET 68, and the output of the AND gate 66 is coupled to an N-channel MOS FET 70. The source terminal of the P-channel type MOS FET 68 is coupled to the positive side of the power supply, while the source terminal of the N-channel type MOS FET 70 is coupled to the negative side of the power supply. The drain terminals of the P-channel type MOS FET 68 and the N-channel type MOS FET 70 are coupled together and connected to the segment electrode 14 of the electrochromic display device 10. Similarly, the drive signal generating circuit 54 comprises latch circuits 72 and 74, inverters 76 and 78, a NAND 80 and an AND gate 82. The latch circuit 72 has the data input terminal which is coupled to the decoder 50, to which one input of the NAND gate 80 is coupled through the inverter 78. The clock terminal of the latch circuit 72 is coupled to receive the clock pulse, which is also applied through the inverter 76 to the clock terminal of the latch circuit 74. The Q output of the latch circuit 72 is coupled to the data terminal of the latch circuit 74 and inputs of the NAND gate 80 and the AND gate 82. The AND gate 82 has its other input coupled to $\overline{Q}$ output of the latch circuit 74. The output of the NAND gate 80 is coupled to a P-channel type MOS FET 84, and an output of the AND gate 82 is coupled to an N-channel type MOS FET 86. The source terminal of the P-channel type MOS FET 84 is coupled to the positive side of the power source, while the source terminal of the N-channel type MOS FET 86 is coupled to the negative side of the power source. The drain terminals of the P-channel type MOS FET 84 and the N-channel type MOS FET 86 are coupled together and connected to the segment electrode 16 of the display device 10. The common electrode 12 of the display device 10 is coupled to the output of an inverter 88, whose input is coupled to the output of an inverter 90 connected to receive a clock pulse from the frequency divider. Inverter 88 has a conductance larger than that of inverter 90.

Figure 6:
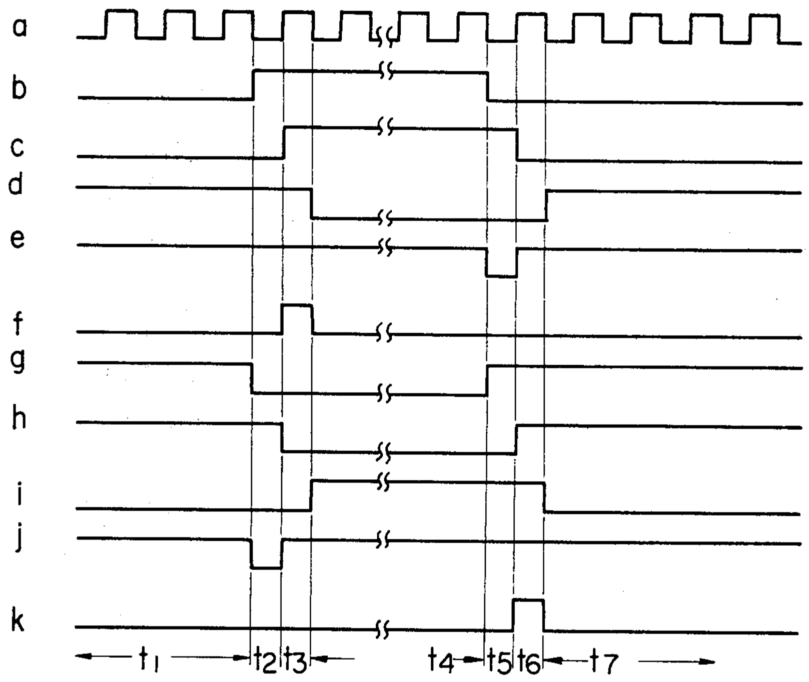
FIG. 6 is a waveform diagram for the driver circuit shown in FIG. 5.

As previously noted, the decoder 50 converts an output signal from the counter 46 into display information signals in a manner as shown by b and g in FIG. 6. The display information signal b is applied to the data terminal of the latch circuit 56, to the clock terminal of which is also applied a clock pulse a shown in FIG. 6. Consequently, the latch circuit 56 generates an output as shown by c in FIG. 6. This output is applied to the data terminal of the latch circuit 58, to which an inverted clock pulse is also applied through the inverter 60. Thus, the latch circuit 58 generates an output d on its $\overline{Q}$ output. The operation of the latch circuit is exemplified in the following Table 1:

| Cl | D | Qn | $\overline{Qn}$ |
|---|---|---|---|
| H | H | H | L |
| H | L | L | H |
| L | | Qn-1 | $\overline{Qn-1}$ |

The NAND gate 64 is responsive to the inverted display information signal and the output c, and generates an output e as shown in FIG. 6. The AND gate 66 is responsive to the outputs c and d from the latch circuits 56 and 58, thereby generating an output f. Similarly, a display information signal g is applied to the data terminal of the latch circuit 72, which is responsive to the clock pulse from the frequency divider to generate an output h. The output h is applied to the data terminal of the latch circuit 74, to the clock terminal of which is also applied an inverted clock pulse. Thus, the latch circuit 74 generates an output i as shown in FIG. 6. The NAND gate 80 is responsive to the output h from the latch circuit 72 and the inverted display information signal, generating an output j as shown in FIG. 6. The AND gate 82 is responsive to the outputs h and i from the latch circuits 72 and 74, thereby generating an output k.

As shown in FIG. 6, the outputs e and j of the NAND gates 64 and 80 are negative pulse signals which fall at the falling edges of the display information signals b and g and remain in negative level for a half cycle of the clock pulse. The outputs f and k of the AND gates 66 and 82 are positive pulse signals which rise after a half cycle of clock pulse from the rising edges of the display information signals and remain at the positive level for a half cycle of the clock pulse. In this manner, the pulse signals are generated dependent upon changes in state of the display information signals. This is advantageous in that an electric current is applied only to a desired display element whose display condition is to be changed whereas the electric current is not applied to the other display element or elements which remain in their previously displayed conditions whereby power consumption can be remarkably reduced.

A positive level of the display information signal indicates that the corresponding display element of the EC display device 10 is to be colored, while a negative level represents the corresponding display element is to be bleached.

During time interval $t_1$ shown in FIG. 6, the output e of the NAND gate 64 is at the high level and, therefore, the P-channel type MOS FET 68 is rendered nonconductive. Since, in this instance, the output f of the AND gate 66 is at the low level, the N-channel type MOS FET 70 is also nonconductive. At the same time, the output j of the NAND gate 80 is at the high level and, consequently, the P-channel type MOS FET 84 is nonconductive. In this instance since the output k of the AND gate 82 is at the low level, the N-channel type MOS FET 86 is also nonconductive. Accordingly, the segment electrodes 14 and 16 of the display device 10 are maintained in the open circuit state, and previously displayed conditions are stored. Since, in these conditions, the display information signal b is at the low level while the display information signal g is at the high level, the segment 14 remains in a previously bleached condition and the segment 16 remains in a previously colored condition, during the time interval $t_1$. On the other hand, the common electrode 12 is coupled to positive potential when the clock pulse is at a high level and a negative potential when the clock pulse is at a low level. During the time period $t_2$ in FIG. 6, the display information signal b is at a high level, indicating that the segment 14 is to be colored, and the display information signal g is at a low level, indicating that the segment 16 is to be bleached. During this period, the output j of the NAND gate 80 is at a low level and, accordingly, the P-channel type MOS FET 84 is rendered conductive, connecting the segment electrode 16 to the positive potential. Since, during the time period $t_2$, the clock pulse a is at a low level, the common electrode 12 is coupled to a negative potential and, therefore, an electric current will flow in a bleaching direction to remove coloration in the segment 16. During this period, the segment electrode 14 remains in its open circuit state. During the period $t_3$ in FIG. 6, the output f of the AND gate 66 is at a high level and the N-channel type MOS FET 70 is rendered conductive, connecting the segment electrode 14 to a negative potential. In this situation, since the common electrode 12 is coupled to a positive potential, an electric current will flow through the segment electrode 14 in a coloring direction so that the segment 14 is changed from its previously bleached condition to a colored condition. In this instance, the segment electrode 16 remains in its opened state. During the period $t_4$, both of the segment electrodes 14 and 16 are maintained in the open state, and the displayed conditions prevalent during the period $t_3$ are stored. During the period $t_5$, the display information signal b for the segment 14 is at the low level, indicating that the segment 14 is to be bleached, while the display information signal g for the segment 16 is high, indicating that the segment 16 is to be colored. In this situation, the output e of the NAND gate 64 is low, connecting the segment electrode 14 to a high potential. At the same time, since the common electrode 12 is coupled to a negative potential, an electric current will flow through the segment electrode 14 in a bleaching direction so that the segment 14 is changed from its previously colored state into a bleached state. On the other hand, the segment electrode 16 remains in the open state. During the period $t_6$, the output k of the AND gate 82 is at the high level, rendering the N-channel type MOS FET 86 conductive thereby coupling the segment electrode 16 to a negative potential. Since, at this instant, the common electrode 12 is coupled to a positive potential, an electric current will flow through the segment electrode 16 in a coloring direction with a result that the segment 16 is changed from its bleached state into a colored state. At the same time, the segment electrode 14 remains in its open circuit state.

During the period $t_7$, both of the segment electrodes 14 and 16 are maintained in the open circuit state and, therefore, the segments 14 and 16 remain in their previously displayed conditions. It will now be understood that in the driver circuit shown in FIG. 5 the common electrode 12 is coupled to a positive level and a negative level when the clock pulse is at a positive and a negative level, respectively, thus providing timings for coloring and bleaching, respectively.

Figure 7:
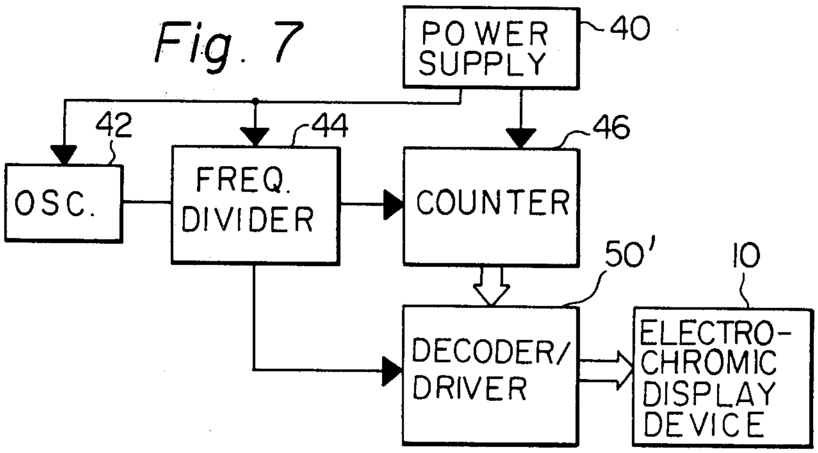
FIG. 7 is a block diagram illustrating a modified form of the electronic timepiece shown in FIG. 4.

While in the illustrated embodiment of FIG. 5 the driver circuit 48 has been shown and described as being separately formed from the decoder 50, it should be noted that a decoder/driver 50' incorporating therein a switching means and a circuit means (not shown) may be directly coupled to the electrochromic display device 10 as shown in FIG. 7, in which like or corresponding components are designated by the same reference numerals as those used in FIG. 4 except that a suffix (') is added to 50. In this case, the decoder/driver 50' may be arranged in a known manner so as to provide drive signals as shown in the following Table 2 which shows a decoder table for the EC display device 10.

Table 2

| | 1 | 2 | 3 | 4 | 5 | 6 | 7 | 8 | 9 | 0 |
|---|---|---|---|---|---|---|---|---|---|---|
| a | L | H | | L | H | | | | | |
| b | | | | | L | | H | | | |
| c | | L | H | | | | | | | |
| d | L | H | | L | H | | L | H | | |
| e | L | H | L | | | H | L | H | L | H |
| f | L | | | H | | | L | H | | |
| g | | H | | | | | L | H | | L |

Figure 8A:
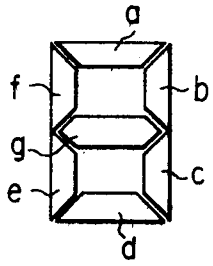
FIG. 8A shows an example of a 7-segment display element.

In Table 2, a symbol "H" denotes that a drive current is applied to the segment electrode of the EC display device in the direction which produces coloration, and a symbol "L" denotes that a drive current is applied to the segment electrode in the direction which removes coloration. As seen from FIGS. 8A and 8B, when the count value in the counter of an electronic timepiece of the liquid crystal display type varies from "0" to "1", display segments b and c are displayed by normally applying drive signals thereto. However, in the EC display device 10 discussed above, when count value in the counter of the electronic timepiece varies from "0" to "1", the display segments b and c are maintained in their previously colored states and the display segments a, d, e and f which have been colored are bleached by applying a drive current to the corresponding segment electrodes as shown in Table 2 in the direction which removes coloration. Likewise, the drive signals are applied to the display elements a, b, d, e and g in the liquid crystal type display device when the count value in the counter varies from "1" to "2". In the EC display device, however, no drive current is applied to the display segment b as shown in Table 2, which consequently remains in its previously colored state. Alternatively, a drive current is applied to the segment electrode corresponding to the display segment c in the direction which removes coloration, and a drive current is also applied to the segment electrodes corresponding to the display segments a, d, e and g in the direction which produces coloration. Finally, a numeral "2" is displayed by the segments a, b, d, e and g. In this manner, the display segment or segments which will be commonly displayed for the following order of numerals are caused to remain in their previously displayed conditions by open circuiting the corresponding segment electrode or electrodes and a drive current is applied only to the segment electrode or electrodes necessary to provide the display of a desired numeral.

Figure 9:
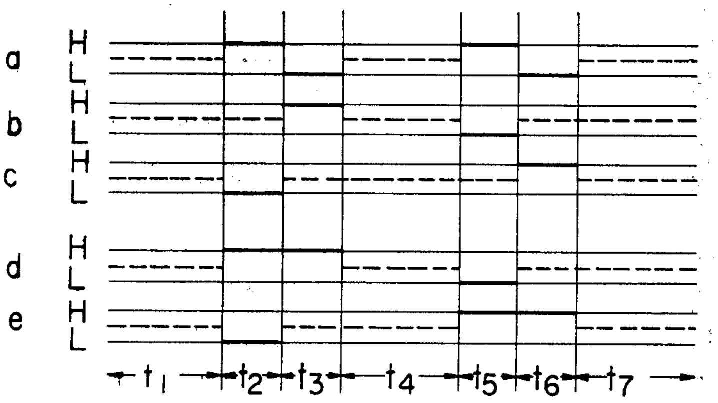
FIG. 9 is a timing chart illustrating an example of a method of driving an electrochromic display device using a single power source.

FIG. 9 illustrates a timing chart for a case in which an EC display device is driven with a single power source by utilizing the means of FIG. 3. The signals shown in FIG. 9 represent the electrode states, with H denoting a state where the electrodes are connected to a positive potential, L denoting a state where the electrodes are connected to a negative potential, and the dotted line denoting a state where the electrodes are open. Signal a denotes the state of common electrode 12, signal b that of segment electrode 14, and signal c that of segment electrode 16. Signals d and e denote other methods of driving segment electrodes 14 and 16.

During the interval $t_1$, common electrode 12 and segment electrodes 14, 16 are all open so that the former state as displayed by segments 14, 16 persists. During the interval $t_2$, common electrode 12 is connected to the positive potential and segment electrode 16 to the negative potential so that segment 16 attains a colored state due to a current flow in the coloring direction. During interval $t_3$, common electrode 12 is connected to the negative potential and segment electrode 14 to the positive potential so that segment 14 is bleached by a flow of current in the bleaching direction. During interval $t_4$, all the electrodes are open as was the case during $t_1$ so that segment 14 remains bleached and segment 16 colored. Proceeding in similar fashion, segment 14 is changed from the bleached to the colored state during interval $t_5$, segment 16 is changed from the colored to the bleached state during interval $t_6$, and segment 14 remains colored and segment 16 bleached during interval $t_7$.

Driving accomplished by signals d and e is an improvement over the method achieved by signals b and c with the difference residing in the fact that segment electrode 14 during $t_2$ and segment electrode 16 during $t_5$ are connected to the positive potential. Since common electrode 12 is connected to the positive potential during $t_2$ and $t_5$, segment electrode 14 during $t_2$ and segment electrode 16 during $t_5$ are short-circuited to the common electrode. This short-circuiting is timed to take place immediately before the flow of current which is to change the segment in the colored state to the bleached state and functions so as to discharge the electric charge maintaining the segment in its colored state. Timing the short-circuit in this manner makes it possible to reduce the energy necessary for causing a current flow in the bleaching direction and shortens the current flow time.

According to the method as described in FIG. 9, a current is caused to flow in the coloring direction after the flow of current in the bleaching direction. AS a result, there is a possibility that applying this method to an EC display device having a slow speed of response will produce a temporarily erroneous display. For example, a figure resembling ≡ may appear when a 7-segment display is converted from the digit 2 to the digit 3. It is thus an object of this invention to provide a driver circuit employing a single power source which can be applied to EC display devices having a slow speed of response.

Figure 10:
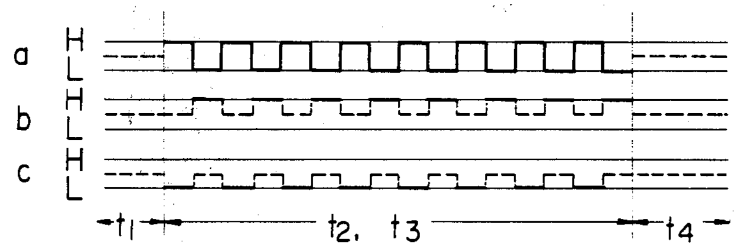
FIG. 10 is a timing chart illustrating a driving method of the present invention.

FIG. 10 illustrates a timing chart showing a driving method according to the invention. Signal a represents the state of common electrode 12, signal b that of segment electrode 14, signal c that of segment electrode 16. An expanded view corresponding to intervals $t_2$, $t_3$ of FIG. 9 is shown in FIG. 10. According to the driving method as shown in FIG. 10, common electrode 12 is alternately connected to the positive and negative potentials. When the common electrode 12 is connected to the negative potential, segment 14 to be changed from the colored to the bleached state is connected to the positive potential and a current flows in the bleaching direction. Similarly, when the common electrode 12 is connected to the positive potential, segment 16 to be changed from the bleached to the colored state is connected to the negative potential and a current flows in the coloring direction. If the time for one passage of current is set so as to be shorter than the time required for changing the displayed state, the displayed states will change gradually and the change will be completed in a substantially simultaneous manner while a current is caused to flow alternately through segment 14 and segment 16 in a repetitive fashion. Accordingly, erroneous displays do not appear when change-overs occur. Moreover, the display suffers no ill effect even if the common electrode is alternately connected to the positive and negative potentials during $t_1$ and $t_4$, as is the case during $t_2$ and $t_3$.

Figure 11:
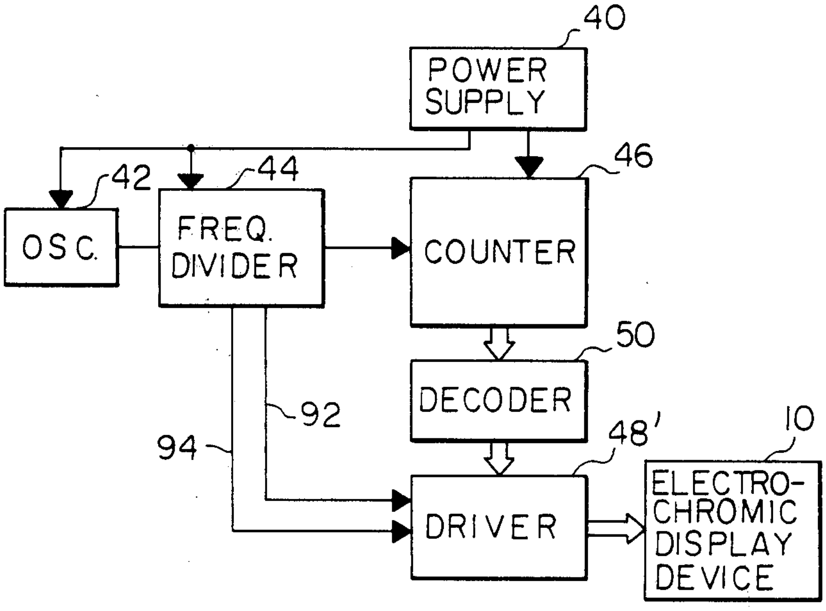
FIG. 11 is a block diagram of an example of an electronic timepiece incorporating a driver circuit arranged to perform the driving method shown in FIG. 10.

FIG. 11 shows a block diagram of an example of an electronic timepiece adapted to perform a driving method according to the present invention mentioned above with reference to FIG. 10. The electronic timepiece shown in FIG. 11 differs from the embodiment shown in FIG. 4 only in that a driver circuit 48' is specifically arranged and, therefore, other corresponding or like components are designated by the same reference numerals as those used in FIG. 4. In the electronic timepiece shown in FIG. 11, the driver circuit 48' receives display information signals decoded by the decoder 50 and is responsive to first and second clock pulses delivered from the frequency divider 44 via lines 92 and 94 for thereby driving the EC display device 10 in a time divided relationship.

Figure 12:
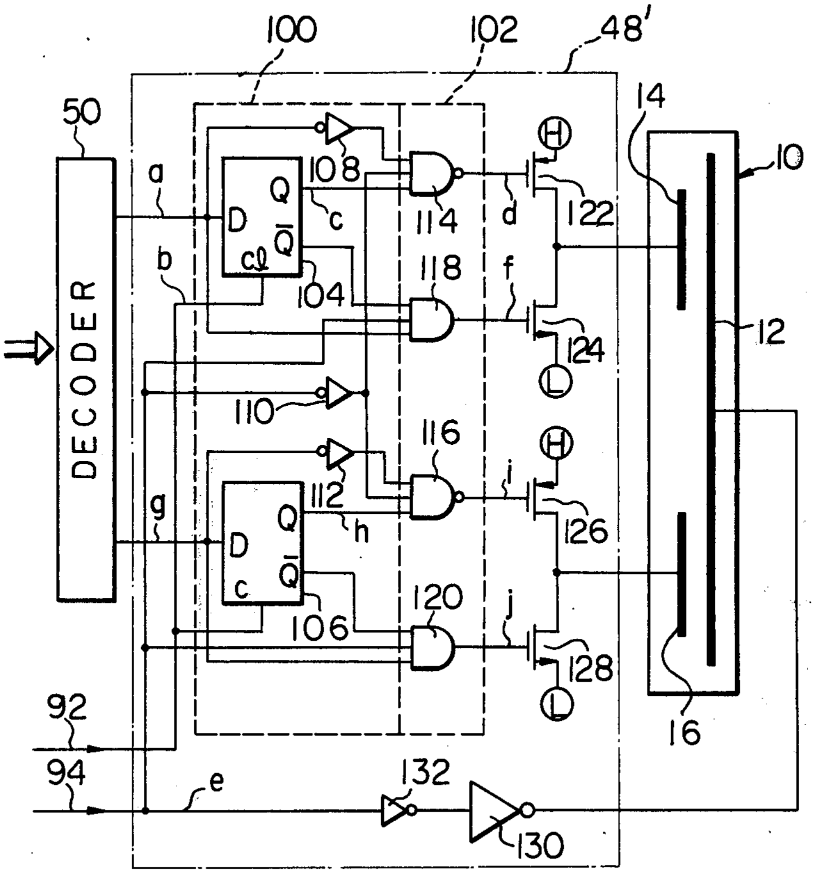
FIG. 12 is a detail circuitry for the driver circuit shown in FIG. 11.

An example of a detailed circuit for the driver circuit 48' is shown in FIG. 12. As shown, the driver circuit 48' generally comprises a memory circuit 100 coupled to the decoder 50 for storing display information signals delivered therefrom and generating output signals in response to the first clock pulse delivered through line 92, and gate means 102 coupled to outputs of the memory circuit 100 and responsive to the second clock pulse delivered through line 94 for generating time-multiplexed drive signals within a half cycle of the first clock pulse.

Figure 13:
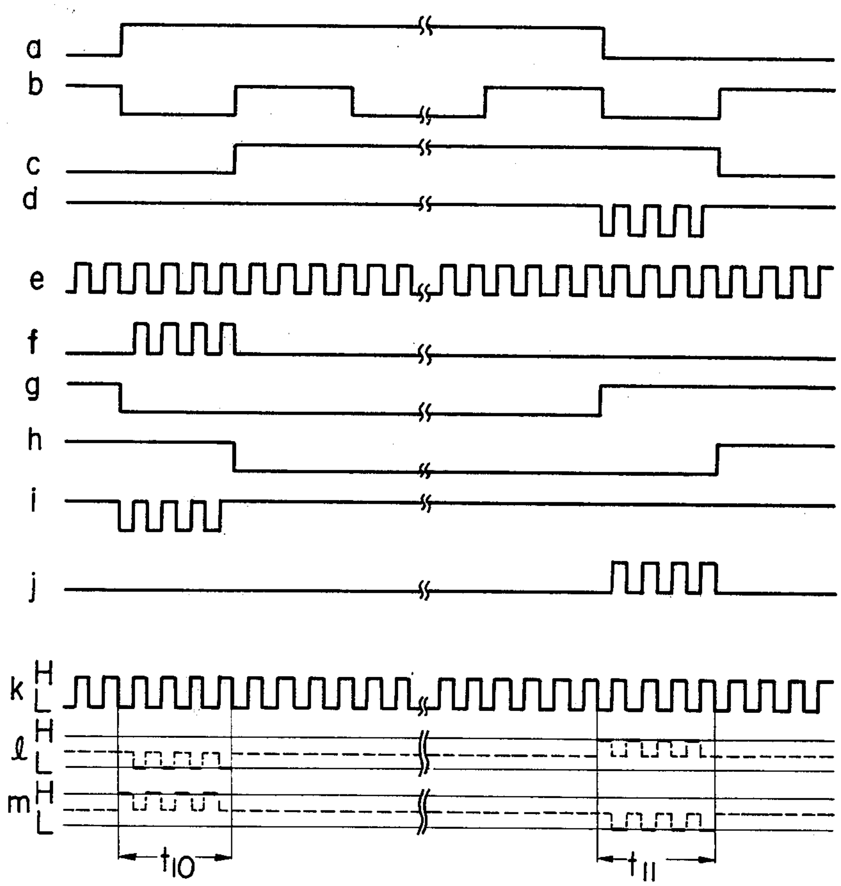
FIG. 13 is a waveform diagram for the circuit shown in FIG. 12.

The memory circuit 100 comprises first and second latch circuits 104 and 106, and inverters 108, 110 and 112. The gate means 102 comprises NAND gates 114 and 116, and AND gates 118 and 120. The first latch circuit 104 has a data terminal coupled to a first output of the decoder 50 to receive a first display information signal a shown in FIG. 13. The $\overline{Q}$ output of the latch circuit 104 is coupled to the first input of the NAND gate 114, which has a second input coupled through the inverter 108 to the first output of the decoder to receive the first display information signal, and a third input coupled to the line 94 through the inverter 110 to receive the second clock pulse e as shown in FIG. 13. The Q output of the first latch circuit 104 is coupled to the first input of the AND gate 118, which has a second input coupled to receive the first display information signal a, and a third input coupled to receive the second clock pulse e. The clock terminal of the first latch circuit 104 is coupled to the line 92, to which the clock terminal of the second latch circuit 106 is also coupled to receive the first clock pulse b as shown in FIG. 13. Likewise, the second latch circuit 106 has a data terminal coupled to a second output of the decoder 50 to receive a second display information signal g as shown in FIG. 13. The Q output of the second latch circuit 106 is coupled to the first input of the NAND gate 116, which has a second input coupled to the second output of the decoder 50 through the inverter 112, and a third input coupled to receive the second clock pulse e through the inverter 110. The $\overline{Q}$ output of the second latch circuit 106 is coupled to a first input of the AND gate 120, which has a second input coupled to receive the second display information signal g, and a third input coupled to the line 94 to receive the second clock pulse e.

The NAND gate 114 has an output coupled to the gate terminal of a P-channel type MOS FET 122, whose source terminal is coupled to a positive potential. The AND gate 118 has an output coupled to the gate terminal of a N-channel type MOS FET 124, whose source terminal is coupled to a negative potential. The drain terminals of the P-channel type MOS FET 122 and the N-channel type MOS FET 124 are coupled together and connected to the segment electrode 14. The NAND gate 116 has an output coupled to the gate terminal of a P-channel type MOS FET 126, whose source terminal is coupled to a positive potential. The AND gate 120 has an output coupled to the gate terminal of an N-channel MOS FET 128, whose source terminal is coupled to a negative potential. The drain terminals of the P-channel type MOS FET 126 and the N-channel type MOS FET 128 are coupled together and connected to the segment electrode 16. The common electrode 12 is coupled to the line 94 through inverters 130 and 132 to receive the second clock pulse e from the frequency divider. Inverter 130 has a conductance larger than that of inverter 132.

The latch circuits 104 and 106 will operate in the same manner as shown in Table 1. When the data terminal and clock terminal of latch circuit 104 shown in FIG. 12 are respectively supplied with the display information signal denoted by a and the first clock pulse denoted by b as shown in FIG. 13, an output signal as denoted by c is produced. The output signal c is applied to the NAND gate 114, to which the inverted second clock pulse e via line 94 and the inverted display information signal are also applied. Therefore, the NAND gate 114 will generate an output signal as shown by d in FIG. 13. The inverted output signal c, the display information signal a and the second clock pulse e are applied to the AND gate 118, which generates an output signal as shown by f in FIG. 13. Similarly, when a display information signal denoted by g is impressed upon the data terminal of latch circuit 106, the output signal from latch circuit 106, the output signal from the NAND gate 116 and the output signal from the AND gate 120 assume the waveforms as denoted respectively by signals h, i and j in FIG. 13.

The change in state of the display information signal is synchronized with the fall of the first clock pulse and lags it slightly. Preferably, the clock pulse is selected to have a pulse width narrower than a response speed of the EC display device. Display information signals at the H level represent coloration of the segment and represent a bleached state when at the L level. P-channel MOS FETs 122 and 126 are turned ON when the gate potential is at the low level, and N-channel MOS FETs 124 and 128 are turned ON when the gate potential is at the high level. Segment electrode 14 and segment electrode 16 therefore attain the states as denoted respectively by l and m in FIG. 13. In addition, common electrode 12 attains the state denoted by k. The states attained by each electrode during the interval $t_{10}$ in FIG. 13 are equivalent to the states attained during the intervals $t_2$, $t_3$ in FIG. 10. As is apparent from the timing chart shown in FIG. 13, a current flows alternately and repetitively through segment 14 in a coloring direction and through segment 16 in a bleaching direction during the interval $t_{10}$ whenever the display information signal a of segment 14 attains the H level and the display information signal g of segment 16 attains the L level. Therefore, segments 14 and 16 will undergo a gradual change in state which will be completed in a substantially simultaneous manner, and segments 14 and 16 will color and bleach, respectively. When the display information signal of segment 14 denoted by a changes to the L level and the display information signal of segment 16 denoted by g changes to the H level, a current flows alternately and repetitively through segment 14 in the bleaching direction and through segment 16 in the coloring direction during the interval $t_{11}$ so that segments 14 and 16 undergo a gradual change in state which will be completed in a substantially simultaneous manner, and segments 14 and 16 will bleach and color, respectively.

Figure 8B:
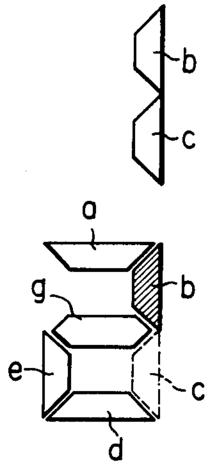
FIG. 8B is a view illustrating a driving method of the display element.

Turning now to FIG. 8B, there is shown a manner in which display segments are colored or bleached. When changing a displayed digit from 1 to 2 as shown in FIG. 8B, the segment b is continously driven while the displayed condition of the segment c is stopped. In this instance, a drive signal is applied to anew segments a, d, e and g. This holds for conventional display elements such as liquid crystals but when electrochromic materials are used their persistence makes it unnecessary to continuously drive the segment b while the instantaneous application of a potential bleaches segment c and colors anew segments a, g, e and d. However, since the electrochromic material posseses a slow bleaching speed, an image of segment c remains and can be seen along with the colored segments a, g, e and d with the result that the digit 2 is not correctly displayed. Segment c must therefore be bleached immediately before segments a, g, e and d are colored. This is achieved by applying reverse polarity voltage for bleaching segment c before the application of a voltage which colors segments a, g, e and d. The segment b, meanwhile, is allowed to remain in its displayed state as governed by its persistence.

Figure 14A:
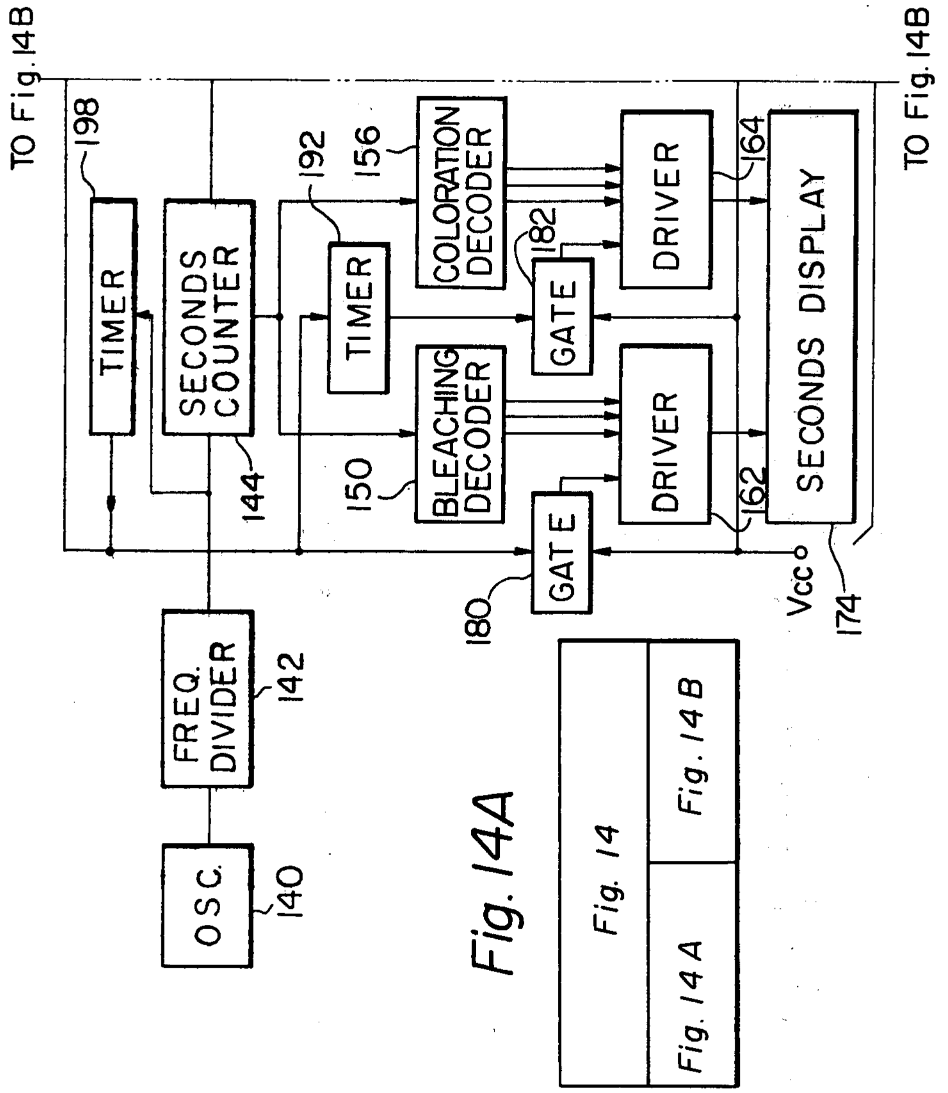
FIG. 14 (comprised of A and B) is a block diagram of an electronic timepiece illustrating another driving method of the present invention.
Figure 14B:
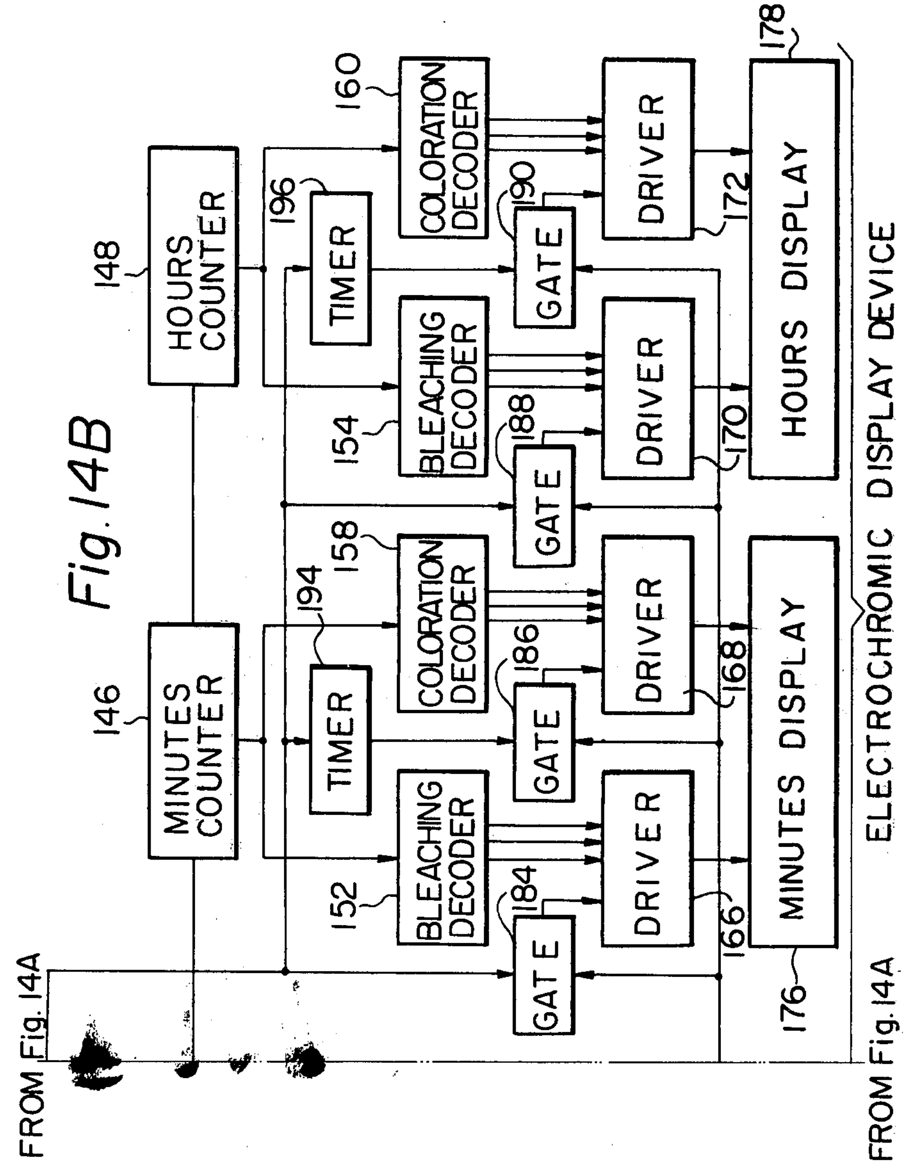

FIG. 14 represents an example of a block diagram of a drive system arranged to achieve the above concept. The numeral 140 denotes an oscillator circuit, 142 a frequency divider, 144 a seconds counter , 146 a minutes counter, 148 an hours counter, 150, 152, and 154 bleaching decoders, 156, 158 and 160 coloration decoders,162, 164, 166, 168, 170 and 172 driver circuits, 174 a seconds display device, 176 a minutes display device, 178 an hours display device, 180, 182, 184, 186, 188 and 190 gates associated with respective driver circuits 192, 194 and 196 timers, and 198 a timer coupled to an output of frequency divider 142 and associated with the bleaching operation. The timer 198 generates a first timing signal which is applied to the timers 192, 194 and 196, which generate second timing signals delayed in phase from the first timing signal.

One-second signals from divider 142 are counted by seconds counter 144 and count signals are applied as inputs to bleaching decoder 150 and coloration decoder 156. Bleaching decoder 150 selects the segment to be bleached by the application of a voltage having a reversed porality. Accordingly, in a case where the count value in seconds counter 144 changes from "1"to "2" as shown in FIG. 8B, the segment c is selected by bleaching decoder 150. At the same time, a first timing signal from timer 198 opens gate 180, thereby impressing voltage Vcc upon driver 162. At this instance, driver 162 generates a drive signal which is applied to seconds display device 174. Thus, the bleaching of the segment c is started in response to the first timing signal from timer 198. After a predetermined time interval, timer 192 generates a second timing signal which is applied to gate 182 to cause this gate to be opened. Therefore, the voltage Vcc is applied to driver 164 which generates a drive signal. This drive signal is in turn applied to seconds display device 174. Thus, the segments a, d, e and g which have been selected by coloration decoder 156 are applied with electric current in the coloring direction. In this manner, the electric current is first applied to the segment c in response to the first timing signal from timer 198 and subsequently applied to the segments a, d, e and g in response to the second timing signal from timer 192. Under these circumstances, the segments a, d, e and g are colored during a subsequent stage in bleaching operation of the segment c such that bleaching of the segment c and coloration of the segments a, d, e and g will be completed substantially at the same time as shown in FIG. 15 and, therefore, the digit "2" is correctly displayed.

The segment to be bleached by bleaching decoder 150 is selected by the signal from seconds counter 144, and driver circuit 162 impresses a voltage of an opposite polarity upon this segment in a manner as previously stated. The time required for the segment to bleach depends upon the particular electrochromic material employed although this can be set to the most suitable value by timer 198. In other words, a signal from seconds counter 144 causes timer 198 to operate at a time best suited for bleaching, whereby a signal is impressed upon gate 180 after this period of time has elapsed. This causes gate 180 to cut off, removing voltage Vcc from driver circuit 162 while the signal from timer 198 is also impressed upon timer 192 which in turn selects a time suitable for achieving coloration of the electrochromic material. The timing at which the second timing signal is generated is preferably determined in dependence on a bleaching speed of the particular electrochromic material used for the EC display device. The timers may be of any suitable construction such as multivibrators, counters employing flip-flops, etc.

Figure 15:
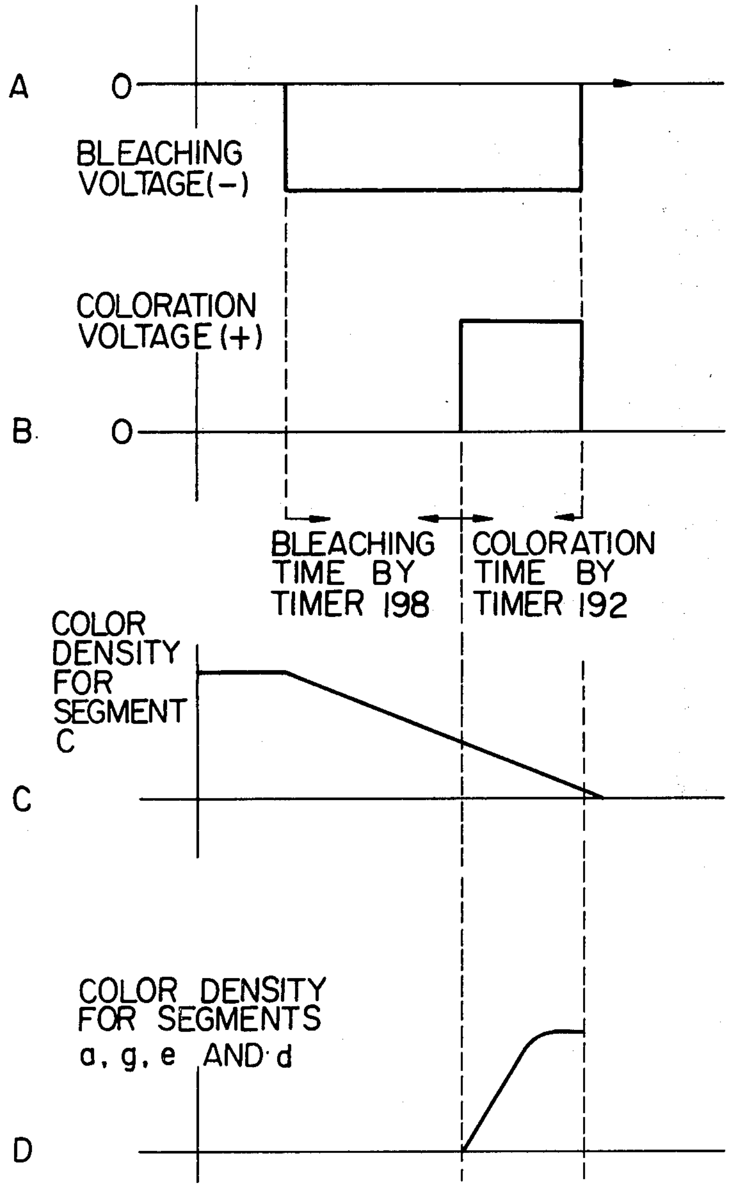
FIG. 15 (*a–d*) is a timing chart corresponding to the coloration and bleaching operations performed by the circuit shown in FIG. 14.

FIG. 15 illustrates a time chart corresponding to the coloration and bleaching processes mentioned above. A represents the bleaching voltage which, when impressed upon segment c, causes the color of the segment to fade as shown by C. B represents the coloration voltage which, when impressed upon segments a, g, e, and d, causes these segments to color as shown by D.

According to the electrochromic display drive system of this invention as thus described, segments are caused to conduct during time intervals which are delayed in phase so as to prevent unnecessary segments from appearing and hence interfering with the display of the desired digits, an extremely advantageous factor for displayed produced by electrochromic materials. This method can also be applied in identical manner for the minutes and hours displays as well. Moreover, it is possible to shorten the time required for bleaching by impressing a higher voltage upon the driver circuits for the bleaching operation.

While the present invention has been shown and described with reference to a particular embodiments in which a driver circuit for an electrochromic display device is combined with component parts of an electronic timepiece by way of example, it should be noted that the driver circuit may be combined with other electronic devices such as calculators, etc. Further, while in the illustrated embodiment of FIG. 12, the driver circuit has been shown and described as being arranged to generate various drive signals in dependence on the display information signals, it should be understood that a decoder/driver may be provided which generates drive signals in the similar manner as the driver circuit. It should also be born in mind that a driving method and a driver circuit proposed by the present invention may be applied to any other type of display devices having a slow response speed in bleaching or coloration.

What is claimed is:

1. A driver circuit for an electrochromic display device powered by a single power supply having high and low voltage potentials and including segment electrodes and a common electrode to display information in response to a display information signal, comprising:

first and second switching means, connected between said single power supply and said common electrode, for alternately coupling said common electrode to the high and low voltage potentials in response to a clock signal of a predetermined frequency, with the clock signal varying alternately between said high and low voltage potentials to enable coloring and bleaching operation of said display device;

first storage means for storing said display information signal and producing a first output signal delayed in phase from said display information signal;

second storage means for storing said first output signal and producing a second output signal delayed in phase from said first output signal;

means for generating a coloration signal in synchronism with the high voltage potential of said clock signal in response to said first and second output signals;

means for generating a bleaching signal in synchronism with the low voltage potential of said clock signal in response to said display information signal and said first output signal;

third switching means coupled to each of said segment electrodes and conductive in response to said bleaching signal to cause an electric current to flow through each of said segment electrodes in a direction to induce bleaching when said common electrode is at said high voltage potential; and fourth switching means coupled to said each of said segment electrodes and conductive in response to said coloration signal to cause an electric current to flow through said each of said segment electrodes in a direction to induce coloration when said common electrode is at said low voltage potential.

2. A driver circuit according to claim 1, in which each of said first, second, third and fourth switching means comprises a metal oxide semiconductor field-effect transistor.

3. A driver circuit according to claim 2, in which said first storage means comprises a latch circuit having a data input terminal adapted to receive said display information signal, a clock input terminal adapted to receive said clock signal, and an output coupled to said coloration signal generation means to apply thereto said first output signal and to said second storage means.

4. A driver circuit according to claim 3, in which said second storage means comprises: an inverter with an input connected to said clock signal; a latch circuit having a data input terminal coupled to the output of said first storage means, a clock input terminal coupled to an output of said inverter, and an output coupled to said coloration signal generation means to apply thereto said second output signal, whereby said coloration signal generation means is responsive to said first and second output signals to provide said coloration signal.

5. A driver circuit according to claim 4, in which siad coloration signal generation means comprises an AND gate having its output coupled to said fourth switching means.

6. A driver circuit according to claim 4, in which said bleaching signal generation means comprises a NAND gate having first and second inputs, said first input coupled to the output of said first storage means to receive said first output signal therefrom, and said second input coupled to an output of an inverter to receive an inverted one of said clock signal.

7. A driver circuit for an electrochromic display device powered by a single power supply having high and low voltage potentials and including segment electrodes and a common electrode to display information in response to a display information signal, comprising:

first and second switching means, connected between said single power supply and said common electrode, for alternately coupling said common electrode to the high and low voltage potentials of said single power supply in response to a first clock signal of a relatively high frequency;

storage means for storing said display information signal in response to a second clock signal lower in frequency than said first clock signal and generating first and second output signals delayed in phase from said display information signal;

means for generating a coloration signal in response to said display information signal, said second output signal and said first clock signal, with said coloration signal having potential levels varying in synchronism with said first clock signal;

means for generating a bleaching signal in response to said display information signal, said first output signal and said first clock signal, with said bleaching signal having potential levels varying in synchronism with said first clock signal;

third switching means coupled to each of said segment electrodes and conductive in response to said bleaching signal to cause an electric current to flow through said each of said segment electrodes in a direction to induce bleaching when said common electrode is at said low voltage potential; and fourth switching means coupled to said each of said segment electrodes and conductive in response to said coloration signal to cause an electric current to flow through said each of said segment electrodes in a direction to induce coloration when said common electrode is at said high voltage potential.

8. A driver circuit according to claim 7, in which each of said first, second, third and fourth switching means comprises a metal oxide semiconductor field-effect transistor.

9. A driver circuit according to claim 7, in which said storage means comprises a latch circuit having a data input terminal adapted to receive said display information signal, a clock input terminal adapted to receive said second clock signal, a first output coupled to said bleaching signal generation means to apply thereto said first output signal, and a second output coupled to said coloration signal generation means to apply thereto said second output signal.

10. A driver circuit according to claim 7, in which said bleaching signal generation means comprises a gate circuit having inputs adapted to receive said display information signal, said first output signal and said first clock signal.

11. A driver circuit according to claim 7, in which said coloration signal generation means comprises a gate circuit having inputs adapted to receive said display information signal, said second output signal and said first clock signal, and an output coupled to said fourth switching means.

* * * * *